J. R. BAKSTAD.
ELECTRIC HEATER.
APPLICATION FILED OCT. 7, 1920
1,398,168.
Patented Nov. 22, 1921.
2 SHEETS—SHEET 2.
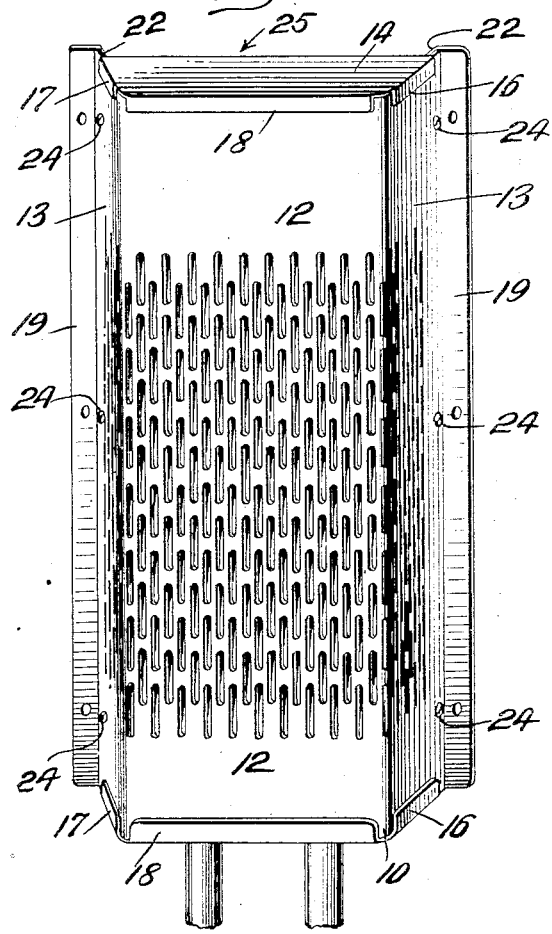
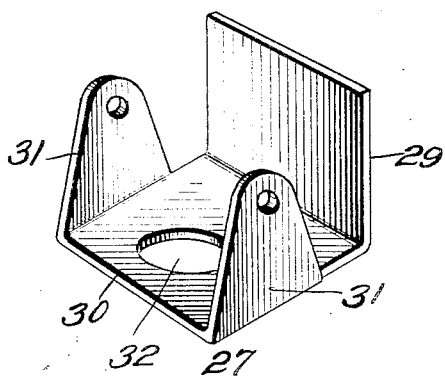
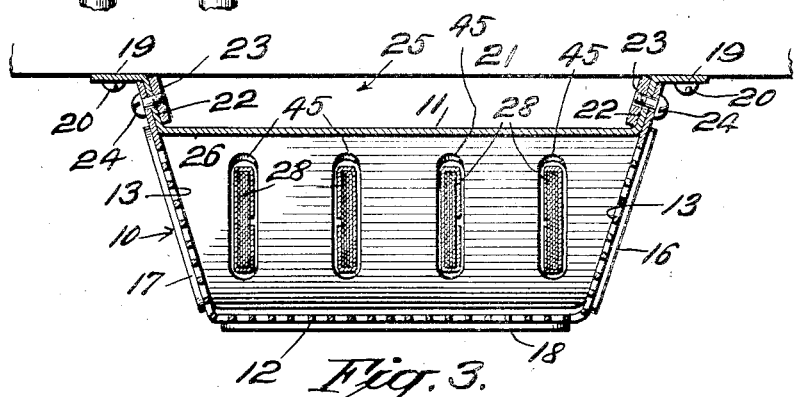
Inventor:
JOHAN R. BAKSTAD,
By his Attorney,
Charles C. Gill.

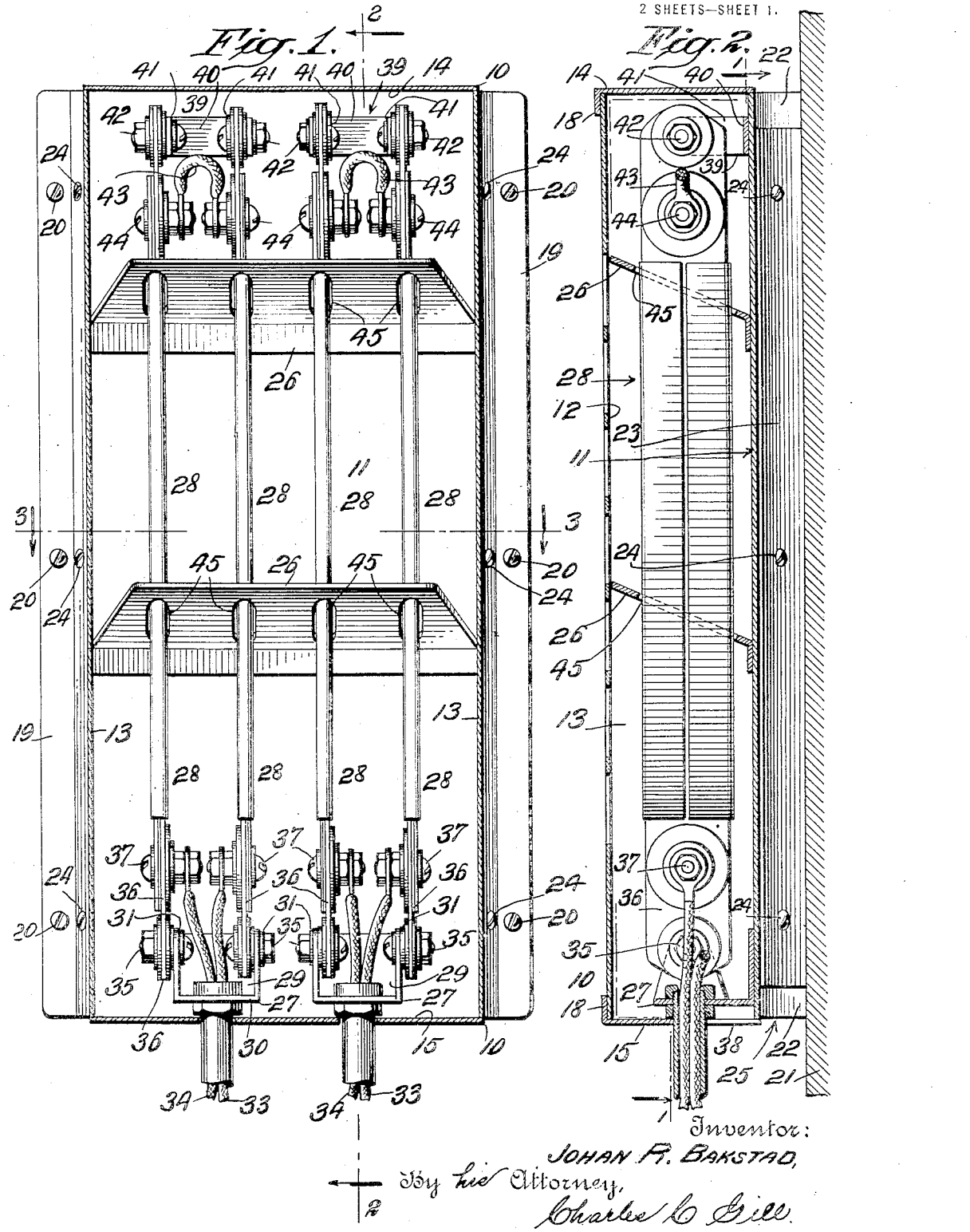

UNITED STATES PATENT OFFICE.

JOHAN R. BAKSTAD, OF CHICAGO, ILLINOIS, ASSIGNOR TO HOLDEN & WHITE, INC., OF CHICAGO, ILLINOIS, A CORPORATION OF ILLINOIS.

ELECTRIC HEATER.

1,398,168.

Specification of Letters Patent. Patented Nov. 22, 1921.

Application filed October 7, 1920. Serial No. 415,293.

*To all whom it may concern:*

Be it known that I, JOHAN R. BAKSTAD, a citizen of the United States, and a resident of Chicago, in the county of Cook and State of Illinois, have invented certain new and useful Improvements in Electric Heaters, of which the following is a specification.

The invention relates to improvements in electric heaters of a character adapted to the heating of the vestibules of passenger cars and the like, and therefore I have designated the heater of this application as of the vestibule type.

Among the purposes of the invention it may be mentioned that I seek to provide a heater of the vestibule type which shall be unobjectionable in appearance, efficient to use, compact, light in weight, easily installed and comparatively inexpensive.

The heater comprises a vertically elongated body casing having a flat front and forwardly converging sides and a back plate adapted in its main portion to fit within, to a suitable extent, the sides of the body casing and to be secured to said body casing and also to the wall, said back plate having side flanges to receive securing screws for fastening the heater as a whole to the wall of a vestibule or other convenient place. The back-plate by being sunken into the body casing, leaves an adequate air space between itself and the adjacent wall, and this is a feature of importance in protecting the wall. The body casing is equipped with upper and lower ends and in its front and sides said body casing is perforated or slotted so as to permit the escape of the heated air. The back plate carries suitable deflectors for directing the heated air outwardly through the perforated body casing and also suitable supporting brackets or frames for receiving the heating elements which I locate within the heater. The heating elements employed by me within the heater are of the type known commercially as the Cutler-Hammer unit, and I may employ as many of these units as may be desired within the heater. In the presentation of the invention herein I illustrate the employment of four of the Cutler-Hammer units within the body casing of the heater, said units being vertically disposed and evenly spaced apart. The conductors for the several units may enter the body casing from the lower end thereof, and my construction of heater is such that the body casing may be removed from the back plate so as to expose the heating units and conductors and returned to position without disturbing said units or conductors.

The invention will be fully understood from the detailed description hereinafter presented, reference being had to the accompanying drawings, in which:

Figure 1 is a vertical longitudinal section through an electric heater constructed in accordance with and embodying my invention, the section being taken on the dotted line 1—1 of Fig. 2;

Fig. 2 is a vertical transverse section through the same, taken on the dotted line 2—2 of Fig. 1;

Fig. 3 is a horizontal section through the same, taken on the dotted line 3—3 of Fig. 1;

Fig. 4 is a perspective view of the heater, and

Fig. 5 is a perspective view of one of the supporting brackets or frames carried by the back-plate of the heater and adapted to the support of the heating units.

In the drawings, 10 designates the main casing of the heater and 11 the back plate thereof, said main casing comprising in one integral piece a front 12 and forwardly converging sides 13, said front and sides being slotted or perforated, as shown in Fig. 1, for the exit of heated air from within the heater and said casing being vertically elongated, as shown. The body casing 10 is equipped with upper and lower ends 14, 15, respectively, which conform to the shape of the body casing in cross-section, but do not extend backwardly to the rear edges of the sides 13 of said casing, said ends terminating at their inner edges along the line of the main body portion of the back plate 11 where said back plate is fitted or offset into the body casing. The upper and lower ends 14, 15 are formed with suitable flanges 16, 17, 18, as clearly represented in Fig. 4, which engage the edge portions of the front and sides of the body casing 10 and are secured by welding or otherwise thereto. The ends 14, 15 become parts of the body casing and close the upper and lower ends of said casing, and by means of their flanges 16, 17 and 18 said ends impart such material strength to the body casing that said casing may be made of sheet metal of reasonable thinness.

The back plate 11 is formed from one integral piece of sheet metal and, as shown in Fig. 3, closely fits within the back portion of the casing 10 and is formed with lateral flanges 19 which afford means to receive screws 20 by which the heater may be fastened to a wall or the like 21. The back plate 11 closes the back portion of the body casing 10 and is flanged, as at 22, to closely engage the inner facing surfaces of the back portions of the body casing, as shown in Fig. 3, and against the flange-portions 22 of said back plate I preferably weld metal backing strips 23 which receive the inner ends of the screws 24 by means of which the body casing 10 is detachably secured to the back plate 11. The body casing 10 may be applied to and removed from the back plate 11 at any time by loosening the screws 24 and without disturbing the back plate or any of the parts carried thereby. The back plate 11 by entering between the inner edges of the sides 13 of the body casing serves to impart strength to said casing so that it may resist strains to which it may be subjected when in use, as by persons knocking against the heater, and in addition the formation of the back plate 11 hereinbefore described, provides for an adequate air space 25 between the heater and the adjacent wall 21, said space being open at its upper and lower ends, as shown in Fig. 2. When the parts are assembled the back plate not only supports the heater but imparts strength thereto, and the upper and lower ends 14, 15 on the body casing not only close the ends of the casing but add material strength to the same.

The back plate 11 carries the internal mechanism of the heater, and this mechanism comprises one or more deflector plates 26, supporting brackets 27, 39 and resistance units 28, in the present instance there being two of the deflectors 26, four of the resistance units 28 and four of the brackets made use of, and all supported from the back plate 11 and having no physical connection with the body casing 10. The deflectors 26 are sheet metal plates which incline upwardly and forwardly and have rear downwardly flanged ends welded or otherwise secured to the back plate 11. The side edges of the deflectors 26 conform to the outline of the sides 13 of the body casing, and said deflectors extend forwardly to the front 12 of said casing, as shown in Fig. 2. The upper deflector 26 is more important than the lower deflector 26, because said upper deflector prevents the pocketing of the heat in the dead space formed within the upper end of the heater, and both deflectors serve to direct the heated air forwardly through the front of the casing 10.

The brackets 27 are all alike, and one of said brackets is shown in perspective in Fig. 5. Each bracket 27 consists of a back member 29, a horizontal member 30 and side standards 31. The back-member 29 of each bracket is welded to the front face of the back-plate 11, and the horizontal members 30 of the brackets project forwardly and are apertured, as at 32, to receive the conduits for the conductors 33, 34. The standards 31 forming a part of the brackets 27, extend upwardly and, by means of suitable screws or bolts 35, have secured to them the lower ends of the bars 36 constituting portions of the resistance units 28. The terminals of the conductors 33, 34 are secured to the bars 36 by means of screws or bolts 37. The bottom end of the casing 10 may slide over the conduits and conductors 33, 34, said end being slotted, as at 38 (Fig. 2), for that purpose. The upper brackets 39 are formed of U-shaped pieces of sheet metal affording back plates 40 and forwardly projecting arms 41, and the upper ends of the bars 36 are secured to the arms 41 by means of bolts 42. The backs 40 of the brackets 39 are welded to the back plate 11. The conductors 43 connecting the upper terminals of the resistance units are connected by bolts 44 to said units, said bolts being extended through the bars 36. The deflectors 26 are slotted, as at 45, for the passage of the resistance units.

The units 28 are alike, and, as hereinbefore explained, are of commercial type and commonly designated as the Cutler-Hammer unit. This unit, as is well known, comprises a ribbon of flat nicrome wire which is wound around a flat mica core and the whole is inclosed within a flat steel casing, this casing being of sheet steel folded over to envelop the interior portions of the unit and a strip of mica being located between the ribbon and the casing to provide for the necessary electrical insulation, as usual.

The Cutler-Hammer unit is more particularly described in Letters Patent No. 795,747, dated July 25, 1905, and No. 811,859, dated February 6, 1906, and since said units form no part of my present invention, aside from their connections or mountings provided by me, I do not enter into a detailed description of the same.

Cross reference is made to my copending application filed October 7, 1920, Serial No. 415,292, for electric heaters, showing in different form, arrangement and organization some of the general features of my present invention, the heater described in said application 415,292 being of horizontal construction and adapted to the truss planks of cars and to the conditions incident to the location of the heater on a truss plank, whereas the heater of this application is of vertical construction and adapted for conditions incident to the heating of vestibules of cars.

What I claim as my invention and desire to secure by Letters Patent, is:

1. An electric heater of the character described comprising a vertically elongated body casing perforated for the escape of heated air and having a front, sides and ends, a back plate adapted to be secured to a wall and having its main body portion fitted within the back portion of said casing, means securing the inner edges of said sides to said back plate and removable without disturbing said back-plate, and a resistance heating element within said casing supported from said back plate independently of said casing, the upper and lower ends of said casing terminating at the upper and lower adjacent edges of said back plate so as to leave a free air space between said back plate and the wall to which the heater may be secured.

2. An electric heater of the character described comprising a vertically elongated body casing perforated for the escape of heated air and having a front, sides and ends, a back plate adapted to be secured to a wall and having its main body portion fitted within the back portion of said casing, means securing the inner edges of said sides to said back plate and removable without disturbing said back plate, and a resistance heating element within said casing supported from said back plate independently of said casing, the upper and lower ends of said casing having front and side edge angular flanges receiving the adjacent edge portions of said casing and welded thereto, and the lower one of said ends being slotted to pass over the electrical connections without disturbing the same.

3. An electric heater of the character described comprising an elongated body casing perforated for the escape of heated air and having a front, sides and ends, a back plate flanged at its vertical edges to be secured to a wall and having its body portion fitted within the back of said casing and secured thereto by means permitting the removal of said casing without disturbing said back plate, a resistance heating element within said casing supported from said back plate independently of said casing and a deflector secured to said plate and inclining upwardly and forwardly to the front and sides of said casing to prevent the pocketing of the heated air in the upper end of the heater.

4. An electric heater of the character described comprising an elongated body casing perforated for the escape of heated air and having a front, sides and ends, a back plate adapted to be secured to a wall and having its body portion fitted within the back of said casing, metal strips fastened to said back-plate along its inwardly offset side portions, screws removably securing said body casing to said back-plate along the sides of said offset portion and entering said metallic strips, whereby said casing becomes removably secured to said back-plate, and a resistance heating element within said casing supported from said back plate independently of said casing, the upper and lower ends of said casing terminating at the upper and lower adjacent edges of said back plate so as to leave a free air space behind said back plate, and the lower one of said ends being slotted to pass over the electrical connections without disturbing the same.

5. An electric heater of the character described comprising a vertically elongated body casing perforated for the escape of heated air and having a front, sides and ends, a back plate adapted to be secured to a wall and to detachably receive said body casing, a resistance heating element within the chamber of said casing and means supporting said element from said back plate, the lower end of said casing being slotted to pass over the electrical connections without disturbing the same and the means supporting said resistance element, which itself comprises an elongated bar set on edge, consisting of a frame secured to said back plate for connection with the upper end of said bar and a frame secured upon the lower face of said back plate and comprising a member facing said back plate and welded thereto, a horizontal member having an opening therein for the passage of the electrical connections and a vertical member constituting a standard to which the lower end of said bar is secured.

6. An electric heater of the character described comprising a vertically elongated body casing having a flat perforated front, forwardly converging perforated sides and upper and lower ends, a back plate adapted to be secured to a wall and having a forwardly projecting portion fitted between the back of said body casing and forming an air space behind the heater, a heating resistance supported within the heater from said back plate, and a deflector within said casing supported from said back plate and inclining upwardly and forwardly toward the front and sides of said casing, said ends being permanently secured on said body casing, and the lower end of said casing being slotted to pass over the electrical connections without disturbing the same.

Signed at Chicago, in the county of Cook and State of Illinois, this 27th day of September, A. D. 1920.

JOHAN R. BAKSTAD.